(12) United States Patent
Manz

(10) Patent No.: US 9,296,141 B2
(45) Date of Patent: Mar. 29, 2016

(54) HOT RUNNER NOZZLE FOR INJECTING THERMOPLASTIC MATERIAL INTO A MOULDING TOOL

(71) Applicant: SCHOTTLI AG, Diessenhofen (CH)

(72) Inventor: Willi Manz, Marthalen (CH)

(73) Assignee: HUSKY INJECTION MOLDING SYSTEMS LTD., Bolton, Ontario (CA)

(*) Notice: Subject to any disclaimer, the term of this patent is extended or adjusted under 35 U.S.C. 154(b) by 0 days.

(21) Appl. No.: 14/424,044

(22) PCT Filed: Sep. 3, 2013

(86) PCT No.: PCT/CH2013/000155
§ 371 (c)(1),
(2) Date: Feb. 26, 2015

(87) PCT Pub. No.: WO2014/036663
PCT Pub. Date: Mar. 13, 2014

(65) Prior Publication Data
US 2015/0224692 A1  Aug. 13, 2015

(30) Foreign Application Priority Data

Sep. 4, 2012 (CH) ........................ 1574/12

(51) Int. Cl.
| B29C 45/23 | (2006.01) |
| B29C 45/28 | (2006.01) |
| B29C 45/27 | (2006.01) |
| B29K 101/12 | (2006.01) |

(52) U.S. Cl.
CPC ..... B29C 45/2806 (2013.01); *B29C 2045/2775* (2013.01); *B29C 2045/2834* (2013.01); *B29C 2045/2855* (2013.01); *B29K 2101/12* (2013.01)

(58) Field of Classification Search
CPC .................................. B29C 45/2806
USPC .................. 425/562, 563, 564, 565, 566
See application file for complete search history.

(56) References Cited

U.S. PATENT DOCUMENTS

| 4,712,995 A | 12/1987 | Basnett |
| 5,523,045 A * | 6/1996 | Kudert .................. B29C 45/16 264/255 |
| 6,238,203 B1 * | 5/2001 | Koh ........................ B29C 45/27 425/562 |
| 6,398,541 B1 | 6/2002 | Seres |
| 2006/0147577 A1 * | 7/2006 | Tooman .............. B29C 45/1603 425/564 |
| 2009/0061042 A1 * | 3/2009 | Fairy .................. B29C 45/2806 425/564 |
| 2009/0142440 A1 * | 6/2009 | Babin ................. B29C 45/2806 425/564 |
| 2012/0231111 A1 * | 9/2012 | Catoen ............... B29C 45/2806 425/562 |

FOREIGN PATENT DOCUMENTS

| JP | H07144347 | 6/1995 |
| WO | 9856557 A1 | 12/1998 |

OTHER PUBLICATIONS

International Search Report, 3 pages.

* cited by examiner

*Primary Examiner* — Tim Heitbrink

(57) ABSTRACT

The hot runner nozzle (1) for injecting plastic material into a molding tool comprises a needle valve with a nozzle needle (19) for closing the discharge opening (25). The nozzle needle (19) has the same diameter as the cylindrical bore in the discharge opening (25) and is inserted therein in order to close the cylindrical bore in the discharge opening (25). During the injection process the nozzle needle (19) is outside the melt flow and cannot cause said melt flow to swirl and is not radially loaded by the melt flow.

10 Claims, 4 Drawing Sheets

HOT RUNNER NOZZLE FOR INJECTING THERMOPLASTIC MATERIAL INTO A MOULDING TOOL

The object of the invention is a hot runner nozzle for injecting thermoplastic material into a moulding tool.

BACKGROUND

Hot runner nozzles allow the melt of injectable plastics to be fed in narrow temperature ranges to the cavities of an injection moulding tool. It is important to make sure that when opening the tool, that is, during the parting of the mould halves after solidification of the moulded part, the still liquid plastic melt can escape from the hot runner nozzle at the supply end. To that end, the hot runner nozzle is closed by a needle. For this purpose, in the nozzle opening or the discharge opening in the direction of flow of the melt the needle is inserted from the back in the discharge opening.

Most of the known hot runner nozzles have needles which are arranged axially displaceable in the centre of the melt runner. This means that the melt is always guided through a particular runner length parallel to the nozzle needle. In order to keep the position of the nozzle needle in the region of the nozzle opening, which usually has a diameter of only approximately 1.2 mm, the needle has a diameter of 4 or 5 mm in the rear region. Only the front end of the needle is accordingly provided with a smaller diameter, so that it can enter the nozzle opening. Such nozzle needles have the disadvantage that on the one hand they necessarily have a large diameter and on the other hand have a large mass as a result, which must be moved in the shortest possible time when closing and opening. Furthermore, additional strong forces from the counter-pressure of the melt result from the large projection surface at pressures in the melt of up to 2500 bar, which must be overcome when closing. High capping forces require correspondingly powerful and consequently large drives in terms of volume for the nozzle needles. Moreover, there is a negative effect on the swirling of the melt along the nozzle needle. It is expensive to accommodate these drives in an injection mould with a plurality of cavities, and the cavities cannot be arranged as close together as would be desirable.

A further hot runner nozzle with a needle valve is known from DE 40 21 782 A1, in which the needle is guided at an acute angle and in a separate tube to the side of the melt runner. The tube with the needle joins the melt runner at a small distance to the nozzle opening in such a way that at the end of the injection process the needle at an acute angle from the back can be pushed through a conical inlet region in front of the cylindrical nozzle bore and stops the melt flow. In fact, no undesirable swirling of the plastic melt occurs in this device during the injection process, since it no longer has to be guided along the needle in the melt runner, but the front end of the needle can close the nozzle opening only along a contact line, but does not enter the cylindrical nozzle runner. This has the effect that the cross-section of the nozzle needle must be significantly larger than the nozzle opening, in order to close the nozzle opening securely on the one hand and on the other hand to resist the lateral, radially acting pressure of the melt upon the needle. A further disadvantage of this device is that due to the large cross-section of the nozzle opening in comparison to the cross-section of the nozzle opening, the feed force, which is necessary to advance the needle in a fraction of a second, is relatively large in order to overcome the pressure of up to 2500 bar acting on the end face of the nozzle needle and therefore also the necessarily powerful drive which takes up a lot of space at an acute angle to the side of the nozzle housing.

SUMMARY

An object of the present invention is to create a hot runner nozzle with a needle valve, in which on the one hand a perfect sealing of the nozzle opening at the end of the injection process is achieved, and on the other hand the needle has a cross-section as small as possible and consequently a small mass, which requires a lower capping force and therefore requires a drive for the needle that takes up little space.

A further object of the invention is that the hot runner nozzle is removable from the back as a whole from the moulding tool with little effort, without the moulding tool having to be removed from the injection moulding machine for the removal and exchange or replacement of the elements of the hot runner nozzle.

The hot runner nozzle and the whole needle drive can be replaced directly on the injection machine without disassembly of the moulding tool, should this be necessary because of damage. This measure requires only a few minutes, during which the injection moulding machine must be shut down.

All the fixings for the hot runner nozzle and for the needle drive are housed on a plate.

The whole hot runner nozzle can be made of steel and is therefore subjected to a small amount of wear.

The needle seal is right in front of the nozzle head or in the discharge opening and not in the central region of the melt runner. This excludes the possibility that the disused material remaining and degraded between the seal and the needle can be carried away with the mass flow. All the components apart from the main body of the hot runner nozzle are able to be disassembled from the side.

The mutual distances of the hot runner nozzle can be reduced to a minimum due to the minimal mass and dimensions of the drive elements, so that a larger number of cavities per unit area is possible.

During the injection process the nozzle needle is completely outside the melt flow and is radially exposed to no bending forces. Consequently, it can be very thin and therefore built very easily.

BRIEF DESCRIPTION OF THE SEVERAL VIEWS OF THE DRAWINGS

The invention is described in more detail with reference to an illustrated embodiment.

DETAILED DESCRIPTION

Figure 1:
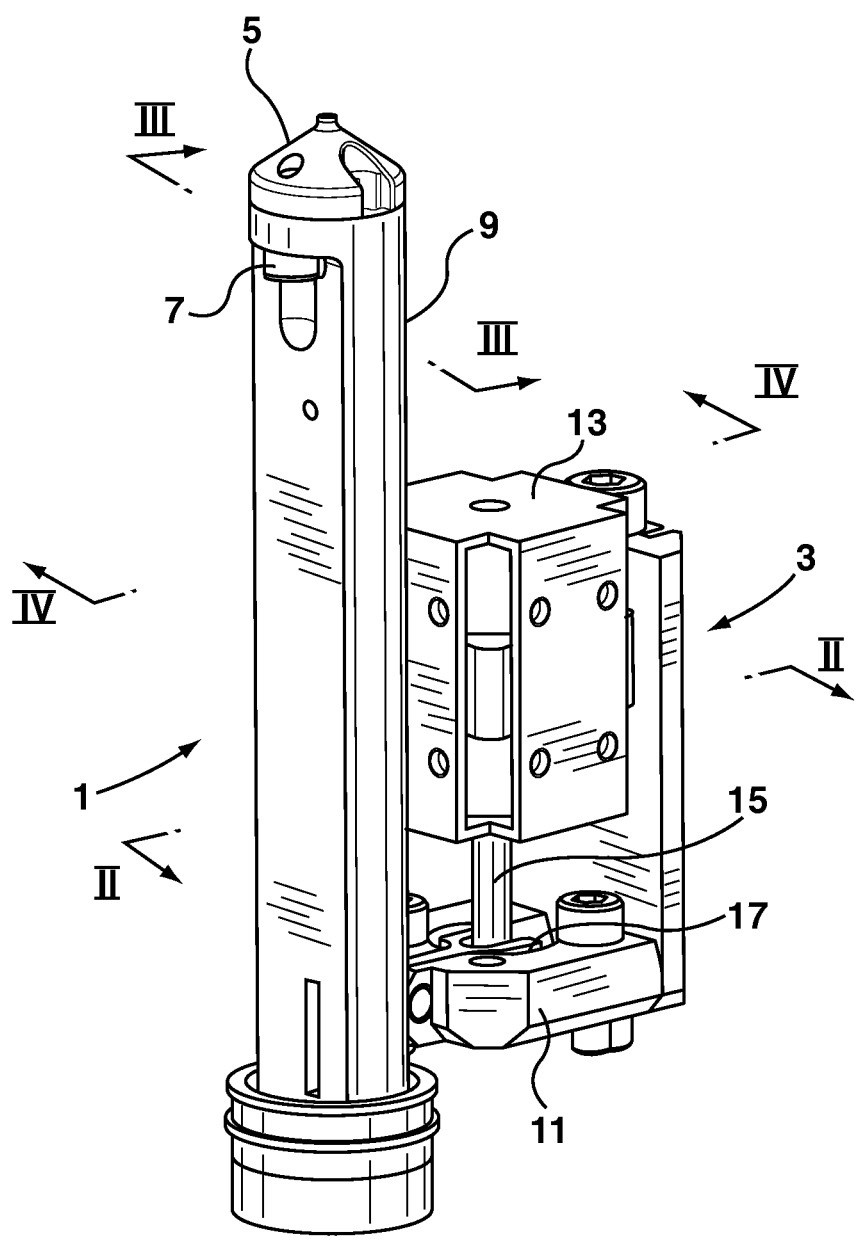
FIG. 1 shows a perspective view of a hot runner nozzle with a needle drive.
Figure 2:
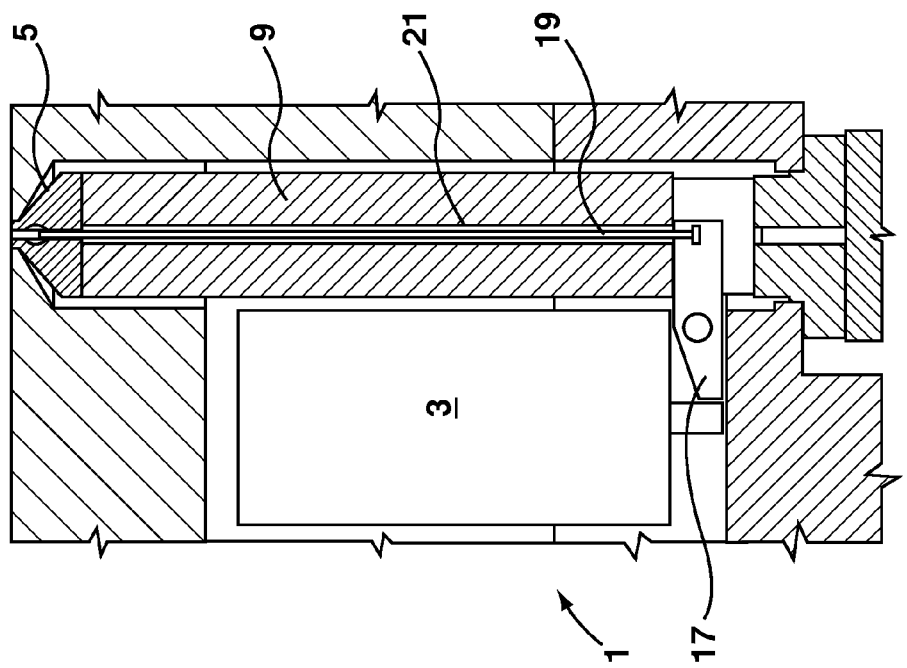
FIG. 2 shows an axial section through the hot runner nozzle and the drive along the line II-II in FIG. 1.

A hot runner nozzle with laterally flanged needle drive 3 is illustrated in FIG. 1 with reference numeral 1. Its nozzle tip 5 is mounted with screws 7, for example, from the front to the cylindrical nozzle body 9. The needle drive 3 comprises a mounting base 11, on which a drive element 13, an electromagnet for example, is mounted. The electromagnet in the present example is connected via a connecting rod 15 pivotally with a two-arm lever 17 to the rear end of a nozzle needle 19 (FIG. 2). Alternatively, the drive can also be arranged axially behind the nozzle needle 19 (not shown). The nozzle needle 19 is guided without clearance into a separate guide tube 21 in the nozzle body 9 displaceably along its axis.

Figure 3:
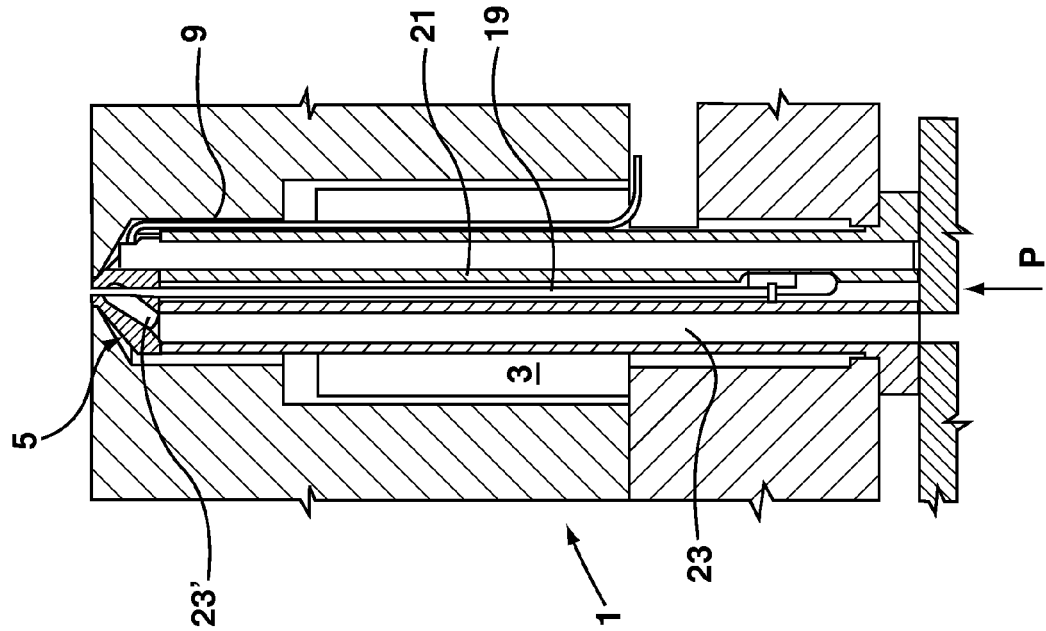
FIG. 3 shows an axial section through the hot runner nozzle and the drive along the line III-III in FIG. 1.
Figure 4:
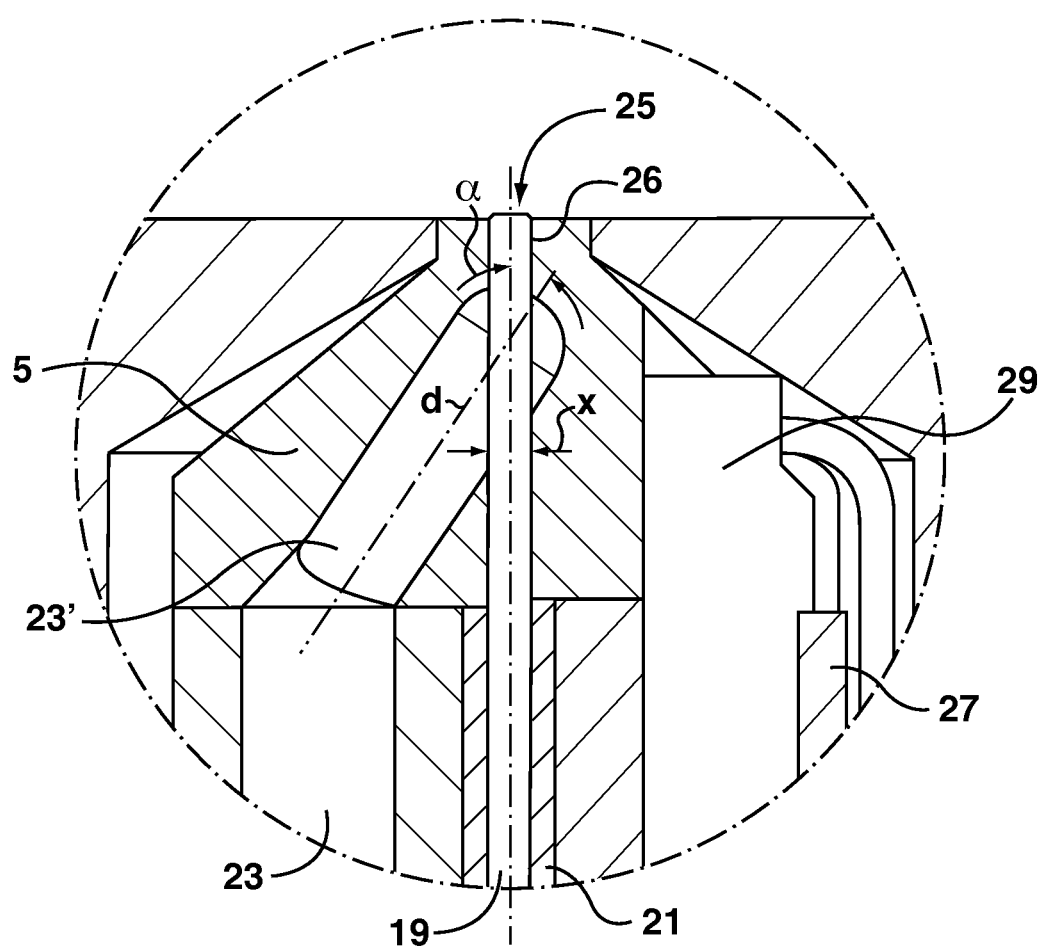
FIG. 4 shows an expanded section of the nozzle tip in FIG. 2

Parallel to the guide tube 21 for the nozzle needle 19 a longitudinal bore 23 is formed in the nozzle body 9 as a runner for the plastic melt (see FIG. 3). The longitudinal bore 23 passes through the nozzle body 9 in the longitudinal direction and then runs at an acute angle $\alpha$ to the needle axis up to the nozzle tip 5 in front of the cylindrically formed region 26 of the discharge opening 25. The discharge opening 25 has a diameter which allows the passage of the nozzle needle 19 without clearance in order to safely prevent the escape of plastic melt between the nozzle needle 19 and the discharge opening 25 at pressures of 2500 bar. In FIG. 4 it is clearly evident that the guide tube 21 for the nozzle needle 19 spaced from the discharge opening 25 joins the section 23' of the longitudinal bore 23 running at an acute angle to the nozzle needle axis. Furthermore, it is evident that also parallel to the axis of the nozzle needle 19 a tube 27 designated to receive a heating rod 29 is arranged. The heating rod 29 is shown in FIG. 4.

Of course, instead of a needle drive 3 with a magnet, as described above, one with a linear motor or a pneumatic drive can also be used.

Figure 5:
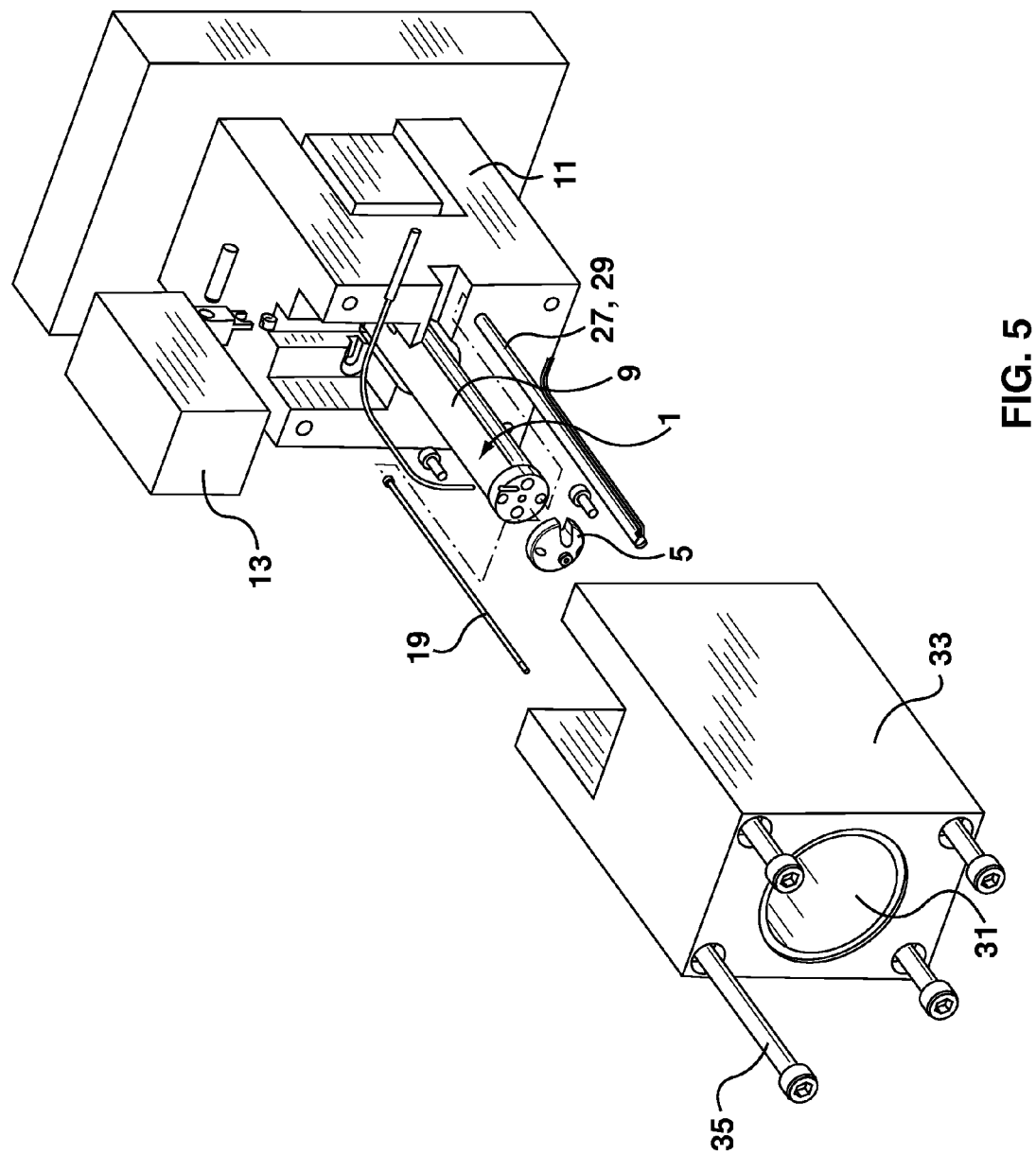
FIG. 5 shows a perspective view of the hot runner nozzle between a moulding part and the receiving plate.

In the exploded view according to FIG. 5 it is very evident how the hot runner nozzle is removable from the moulding tool 33 with the cavity 31. By loosening the screws 35 in the mould separation plane the individual elements, in particular the drive 13, the nozzle needle 19, the nozzle tip 5 and also the heater 29 are exposed and therefore replaceable, without the moulding tool 33 having to be removed from the injection moulding machine.

The operation of the hot runner nozzle 1 will be explained below: hot plastic melt is fed in the direction of the arrow P (FIG. 3) through the longitudinal bore 23 in the nozzle body 9 parallel to the guide tube 21 for the nozzle needle 19 and then via the region 23' of the longitudinal bore 23 of the nozzle tip 5 running at an acute angle to the axis of the nozzle needle 19. The melt, with, for example, an injection pressure of 1000 to 2500 bar, leaves the nozzle tip 5 through the cylindrically formed region 26 of the discharge opening 25 and reaches a distribution channel (not shown), which leads to the cavity or cavities in the injection moulding tool.

During the injection of the plastic melt, the nozzle needle 19 is in the retracted position x, shown in broken lines in FIG. 4, and thus completely outside the flow path of the melt from the longitudinal bore 23 and the region 23' running at an acute angle to the cylindrical region 26 of the discharge opening 25. The melt can flow unhindered and in particular without swirling to the discharge opening 25 and from there can reach the cavities. At the end of the injection cycle and after a period for the build-up of the holding pressure has elapsed, the melt comes to a standstill in the nozzle head 5. Thereafter, only the nozzle needle 19 is inserted from the needle drive 3 through the static melt and into the discharge opening 25 and seals this off completely to the outside. The force required for this is very low, since the projecting surface of the needle 19 corresponds only just to the cross-sectional area of the discharge opening 25. The nozzle needle 19, preferably cylindrically configured over the whole length, forms with the discharge opening 25 an axially running, radially and axially planar leak-free seal (see FIG. 4).

Since the diameter d of the nozzle needle 19 corresponds only just to the diameter of the discharge opening 25, the cross-sectional area $((d/2)^2 \cdot \pi)$ projecting penetratingly into the melt when closing is as small as possible and is several times smaller in comparison to conventional cross-sectional areas of rigid nozzle needles 19 guided wholly or partially in the melt. Preferably, the cross-sectional area of the nozzle needle 19 has approximately $1/12$ of the cross-sectional area of the polymer channel or of the longitudinal bore 23. The cross-sectional ratio can also be between 1:5 and 1:15. This also causes the force to be exerted for the advance of the nozzle needle 19 in the pressurised melt to have only a fraction of the previously required energy. Therefore, as shown in the example, a much smaller electromagnet 13 than before can be used as the drive, which is able to advance and then withdraw again almost delay-free without transmission the nozzle needle 19 via the connecting rod 15 and the lever 17. Two permanent magnets can in the drive element 13 hold the nozzle needle 19 in the respective end points (nozzle "open"/ nozzle "closed") without power. Preferably, the diameter of the valve needle 19 is constant between its drive and its front end.

A tubular hollow space is created in the still plastic-filled "antechamber" (region 23') through the retraction of the nozzle needle 19 before the following injection cycle. This hollow space is used in order to steer the subsequently flowing melt through this tubular hollow space into the cavity 31 at the beginning of the following injection process. That is, it is thereby ensured that the plastic melt passes directly into the cavity 31 without solidified residue (cooled melt), and in fact immediately from the beginning of the injection process. The melt passes from the region 23' of the longitudinal bore 23 running at an acute angle directly to the cylindrical region 26 of the discharge opening 25 without swirling into an antechamber.

LEGEND OF REFERENCE NUMERALS 1 hot runner nozzle
3 needle drive
5 nozzle tip
7 screws
9 nozzle body
11 mounting base
13 drive element
15 connecting rod
17 lever
19 nozzle needle
21 guide tube
23 longitudinal bore
25 discharge opening
26 cylindrical region
27 tube for heating
29 heater
31 cavity
33 moulding tool
35 screws

What is claimed is:
1. Hot runner nozzle for injecting plastic melt into a moulding tool, having a needle valve for closing a discharge opening at an end of an injection process having a needle and having a drive for the needle, the nozzle comprising:
a guide tube disposed within a nozzle body;
the needle is mounted axially within the guide tube such that the needle is guided displaceably and without clear- ance within an entirety of the nozzle body coaxially to an axis of the discharge opening of the hot runner nozzle; and a longitudinal bore for the melt runs in an axis substantially parallel to an axis of the needle and radially outside the guide tube of the needle, wherein a bore section at an end of the longitudinal bore runs at an acute angle ($\alpha$) to the axis of the longitudinal bore and creates a connection between the longitudinal bore and an entrance to a cylindrical region of the discharge opening.

2. Hot runner nozzle according to claim 1, wherein a diameter (d) of the needle corresponds to a diameter of the cylindrical region and is insertable substantially clearance-free axially into the bore in the cylindrical region of the discharge opening.

3. Hot runner nozzle according to claim 1, wherein the diameter (d) of the needle is substantially constant between the drive of the needle and a front end of the needle.

4. Hot runner nozzle according to claim 1, wherein the front end of the needle during the injection process does not protrude into a space at an end of the bore section of the longitudinal bore to the entrance to the cylindrical region of the discharge opening.

5. Hot runner nozzle according to claim 1, wherein a cross-section of the needle in relation to a cross-section of the longitudinal bore is 1:5 to 1:15.

6. Hot runner nozzle according to claim 5, wherein the cross-sectional ratio is 1:12.

7. Hot runner nozzle for injecting plastic into a moulding tool, the nozzle comprising:
   a nozzle body having a guide tube;
   a nozzle tip mounted to an end of the nozzle body, the nozzle tip having a discharge opening;
   a needle axially disposed within the guide tube such that the needle is guided displaceably coaxially to the axis of the discharge opening, the needle being configured to open and close the discharge opening; and
   a longitudinal melt bore disposed along an axis substantially parallel to an axis of the needle and radially outside the guide tube; and
   a bore section defined entirely within the nozzle tip and in fluid communication with the longitudinal melt bore, the bore section extending at an acute angle ($\alpha$) to the axis of the longitudinal bore to create a connection between the longitudinal bore and an entrance to a cylindrical region of the discharge opening.

8. Hot runner nozzle according to claim 7, wherein a diameter (d) of the needle corresponds to a diameter of the cylindrical region and wherein the needle is axially insertable substantially clearance-free into a bore defined by the cylindrical region.

9. Hot runner nozzle according to claim 7, wherein a ratio of a cross-section of the needle to a cross-section of the longitudinal bore is between approximately 1:15 to 1:5.

10. Hot runner nozzle according to claim 9, wherein the ratio is 1:12.

* * * * *